US008924442B2

(12) United States Patent
Patwardhan

(10) Patent No.: US 8,924,442 B2
(45) Date of Patent: Dec. 30, 2014

(54) METHOD AND SYSTEM FOR IMPLEMENTING HIGH AVAILABILITY STORAGE ON THINLY PROVISIONED ARRAYS

(75) Inventor: Kedar Shrikrishna Patwardhan, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 292 days.

(21) Appl. No.: 13/187,289

(22) Filed: Jul. 20, 2011

(65) Prior Publication Data

US 2013/0024486 A1    Jan. 24, 2013

(51) Int. Cl.
*G06F 17/30* (2006.01)
*G06F 3/06* (2006.01)

(52) U.S. Cl.
CPC .............. *G06F 3/0608* (2013.01); *G06F 3/067* (2013.01); *G06F 17/30283* (2013.01); *G06F 3/0631* (2013.01); *G06F 17/30194* (2013.01); *G06F 3/0644* (2013.01)
USPC ....................................................... 707/827

(58) Field of Classification Search
None
See application file for complete search history.

(56) References Cited

U.S. PATENT DOCUMENTS

| | | | | |
|---|---|---|---|---|
| 6,925,515 | B2 * | 8/2005 | Burns et al. ................... | 710/200 |
| 7,231,409 | B1 * | 6/2007 | Chen ..................................... | 1/1 |
| 7,386,559 | B1 * | 6/2008 | Desai et al. ........................... | 1/1 |
| 8,458,181 | B2 * | 6/2013 | Adkins et al. ................. | 707/737 |
| 2007/0156957 | A1 * | 7/2007 | MacHardy et al. ........... | 711/114 |
| 2009/0248763 | A1 * | 10/2009 | Rajan et al. ................... | 707/204 |

* cited by examiner

*Primary Examiner* — Jay Morrison
(74) *Attorney, Agent, or Firm* — Wilmer Cutler Pickering Hale and Dorr LLP

(57) ABSTRACT

A method for storage allocation and reclamation in a storage device. The method includes executing a distributed computer system having a plurality of file systems accessing storage on a shared storage device, creating a physical storage allocation state map that indicates whether a plurality of data blocks comprising a range of data is allocated or unallocated, and consulting a free extent state map to identify free data blocks of the shared storage device. An allocation operation is performed causing the shared storage device to allocate storage a requested range of allocation. The physical storage allocation state map is updated in accordance with the requested range of allocation. Upon a subsequent reclamation process, the physical storage allocation state map is accessed to identify free previously allocated data blocks. Reclamation processing a subsequent performed on the identified free previously allocated data blocks.

20 Claims, 9 Drawing Sheets

METHOD AND SYSTEM FOR IMPLEMENTING HIGH AVAILABILITY STORAGE ON THINLY PROVISIONED ARRAYS

FIELD OF THE INVENTION

The present invention is generally related to digital computer systems.

BACKGROUND OF THE INVENTION

Information drives business. Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Companies have come to rely upon high-availability clusters to provide the most critical services and to store their most critical data. In general, there are different types of clusters, such as, for example, compute clusters, storage clusters, scalable clusters, and the like. High-availability clusters (also known as HA Clusters or Failover Clusters) are computer clusters that are implemented primarily for the purpose of providing high availability of services which the cluster provides. They operate by having redundant computers or nodes which are then used to provide service when system components fail. Normally, if a server with a particular application crashes, the application will be unavailable until someone fixes the crashed server. HA clustering remedies this situation by detecting hardware/software faults, and immediately restarting the application on another system without requiring administrative intervention, a process known as Failover. As part of this process, clustering software may configure the node before starting the application on it. For example, appropriate file systems may need to be imported and mounted, network hardware may have to be configured, and some supporting applications may need to be running as well.

Many distributed computer systems utilize a centralized shared storage system for their provisioning. Thin provisioning is a mechanism that applies to large-scale centralized computer disk storage systems, SANs, and storage virtualization systems. Thin provisioning allows space to be easily allocated to servers, on a just-enough and just-in-time basis.

Thin Provisioning, in distributed computing system using a shared storage environment, is a method for optimizing utilization of available storage. It relies on on-demand allocation of blocks of data versus the traditional method of allocating all the blocks up front. This methodology eliminates almost all whitespace which helps avoid the poor utilization rates, often as low as 10%, that occur in the traditional storage allocation method where large pools of storage capacity are allocated to individual servers but remain unused (not written to). This traditional model is often called "fat" or "thick" provisioning.

With thin provisioning, storage capacity utilization efficiency can be automatically driven up towards 100% with very little administrative overhead. Organizations can purchase less storage capacity up front, defer storage capacity upgrades in line with actual business usage, and save the operating costs (electricity and floor space) associated with keeping unused disk capacity spinning.

Previous systems generally required large amounts of storage to be physically pre-allocated because of the complexity and impact of growing volume (LUN) space. Thin provisioning enables over-allocation or over-subscription.

A volume manager is often used to manage large-scale centralized computer storage systems. However, problems exist where, in such systems, the thinly provisioned arrays change in size and grow. A thinly provisioned array can fail write requests if it runs out of physical storage. If this allocation failure affected a metadata write of the file system, the file system gets marked for file system check. Depending upon the size of the file system, the full file system check can take hours and also result in data corruption or data loss.

SUMMARY OF THE INVENTION

In one embodiment, the present invention is implemented as a method for storage allocation and reclamation in a storage device. The method includes executing a distributed computer system having a plurality of file systems accessing storage on a shared storage device, creating a physical storage allocation state map that indicates whether a plurality of data blocks comprising a range of data is allocated or unallocated, and consulting a free extent state map to identify free data blocks of the shared storage device. An allocation operation is performed causing the shared storage device to allocate storage a requested range of allocation. The physical storage allocation state map is updated in accordance with the requested range of allocation. Upon a subsequent reclamation process, the physical storage allocation state map is accessed to identify free previously allocated data blocks. Reclamation processing a subsequent performed on the identified free previously allocated data blocks.

In one embodiment, the free extent state map is consulted to identify and allocate free data blocks of the shared storage device, and wherein the physical storage allocation state map is consulted to determine whether physical storage of the shared storage device is known to have been previously allocated.

In one embodiment, physical storage allocation state map comprises a map that tracks storage condition of a plurality of chunks of data having a predetermined size.

In one embodiment, the physical storage allocation state map comprises a bitmap, and wherein bits of the bitmap track a storage condition of a plurality of chunks of data having a predetermined size.

In one embodiment, the physical storage allocation state map is accessed to preferentially free blocks of the file system that are indicated as previously allocated.

In one embodiment, the shared storage device comprises a disk array.

In one embodiment, the distributed computer system comprises a cluster.

In one embodiment, the present invention is implemented as a computer readable storage medium having stored thereon, computer executable instructions that, if executed by a computer system cause the computer system to perform a method for storage allocation and reclamation in a storage device. The method includes executing a distributed computer system having a plurality of file systems accessing storage on a shared storage device, creating a physical storage allocation state map that indicates whether a plurality of data blocks comprising a range of data is allocated or unallocated, and consulting a free extent state map to identify free data blocks of the shared storage device. An allocation operation is performed causing the shared storage device to allocate storage a requested range of allocation. The physical storage allocation state map is updated in accordance with the requested range of allocation. Upon a subsequent reclamation process, the physical storage allocation state map is accessed to identify free previously allocated data blocks. Reclamation processing a subsequent performed on the identified free previously allocated data blocks.

In one embodiment, the free extent state map is consulted to identify and allocate free data blocks of the shared storage device, and wherein the physical storage allocation state map is consulted to determine whether physical storage of the shared storage device is known to have been previously allocated.

In one embodiment, physical storage allocation state map comprises a map that tracks storage condition of a plurality of chunks of data having a predetermined size.

In one embodiment, the physical storage allocation state map comprises a bitmap, and wherein bits of the bitmap track a storage condition of a plurality of chunks of data having a predetermined size.

In one embodiment, the physical storage allocation state map is accessed to preferentially free blocks of the file system that have are indicated as previously allocated.

In one embodiment, the shared storage device comprises a disk array.

In one embodiment, the distributed computer system comprises a cluster.

In one embodiment, the present invention is implemented as a computer system having a microprocessor coupled to a computer readable memory, the memory having computer readable code therein which when executed by the computer system causes the computer system to implement a method for storage allocation and reclamation in a storage device. The method includes executing a distributed computer system having a plurality of file systems accessing storage on a shared storage device, creating a physical storage allocation state map that indicates whether a plurality of data blocks comprising a range of data is allocated or unallocated, and consulting a free extent state map to identify free data blocks of the shared storage device. An allocation operation is performed causing the shared storage device to allocate storage a requested range of allocation. The physical storage allocation state map is updated in accordance with the requested range of allocation. Upon a subsequent reclamation process, the physical storage allocation state map is accessed to identify free previously allocated data blocks. Reclamation processing a subsequent performed on the identified free previously allocated data blocks.

In one embodiment, the free extent state map is consulted to identify and allocate free data blocks of the shared storage device, and wherein the physical storage allocation state map is consulted to determine whether physical storage of the shared storage device is known to have been previously allocated.

In one embodiment, physical storage allocation state map comprises a map that tracks storage condition of a plurality of chunks of data having a predetermined size.

In one embodiment, the physical storage allocation state map comprises a bitmap, and wherein bits of the bitmap track a storage condition of a plurality of chunks of data having a predetermined size.

In one embodiment, the physical storage allocation state map is accessed to preferentially free blocks of the file system that have are indicated as previously allocated.

In one embodiment, the shared storage device comprises a disk array, and wherein the distributed computer system comprises a cluster.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Figure 1:
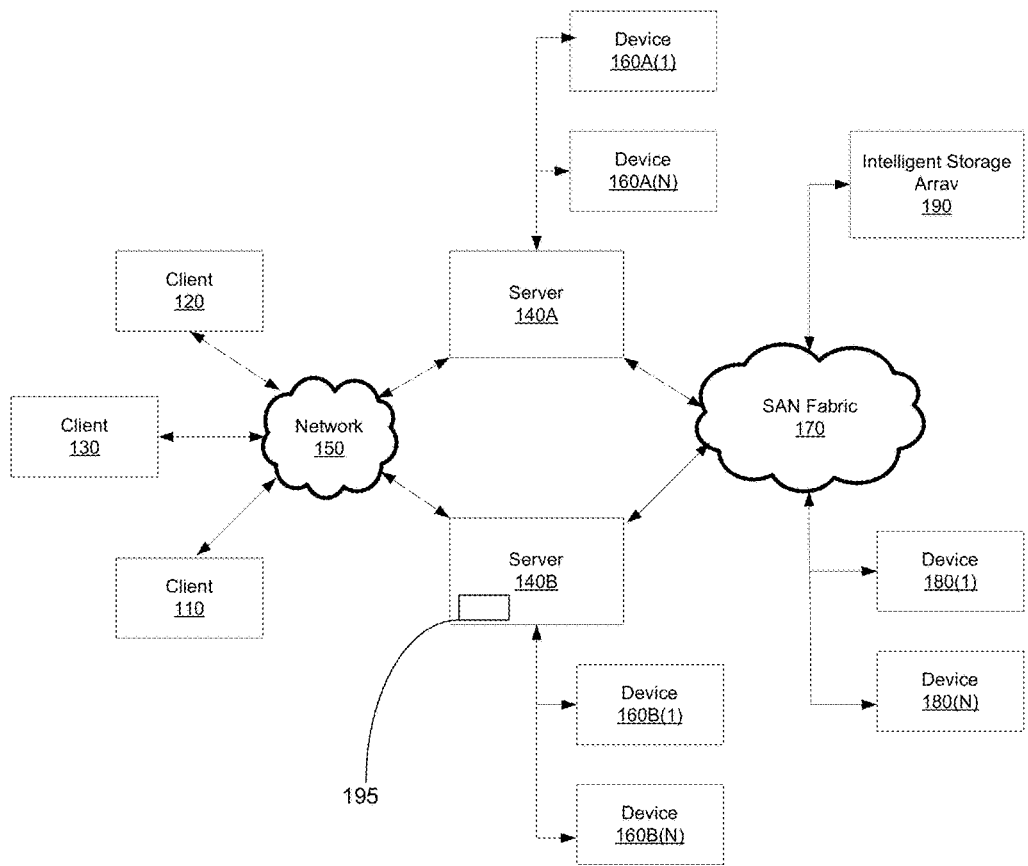
FIG. 1 shows a diagram depicting a network architecture of a client server based computing system in accordance with one embodiment of the present invention.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

FIG. 1 is a block diagram depicting a network architecture 100 in which client systems 110, 120 and 130, as well as storage servers 140A and 140B (e.g., it will and any of which can be implemented using computer system 200), are coupled to a network 150 in accordance with one embodiment of the present invention. A storage server 140A is further depicted as having storage devices 160A(1)-(N) directly attached, and storage server 140B is depicted with storage devices 160B(1)-(N) directly attached. Storage servers 140A and 140B are also connected to a SAN fabric 170, although connection to a storage area network is not required for operation of the disclosure. SAN fabric 170 supports access to storage devices 180(1)-(N) by storage servers 140A and 140B, and so by client systems 110, 120 and 130 via network 150. SAN fabric 170 also supports access to a storage array 190, which is also shown as an example of a specific storage device. Certain functionality of embodiments of the present invention are implemented via a file system allocation and reclamation agent 195, which is shown as instantiated on the server 140B.

Client computer systems 110, 120 and 130 are communicatively coupled via the network 150. Client systems 110, 120 and 130 are able to access information on data server 140A or 140B using, for example, a web browser or other client software (not shown). Such a client allows client systems 110, 120 and 130 to access data hosted by storage server 140A or 140B or one of storage devices 160A(1)-(N), 160B(1)-(N), 180(1)-(N) or storage array 190. Additionally, FIG. 1 depicts the use of a network such as the Internet for exchanging data, but the present disclosure is not limited to the Internet or any particular network-based environment. It should be noted that although two data server nodes 140A and 140B are shown, embodiments of the present invention can function with highly scalable distributed computer systems having hundreds of nodes, or more (e.g., cloud computing system, etc.).

Figure 2:
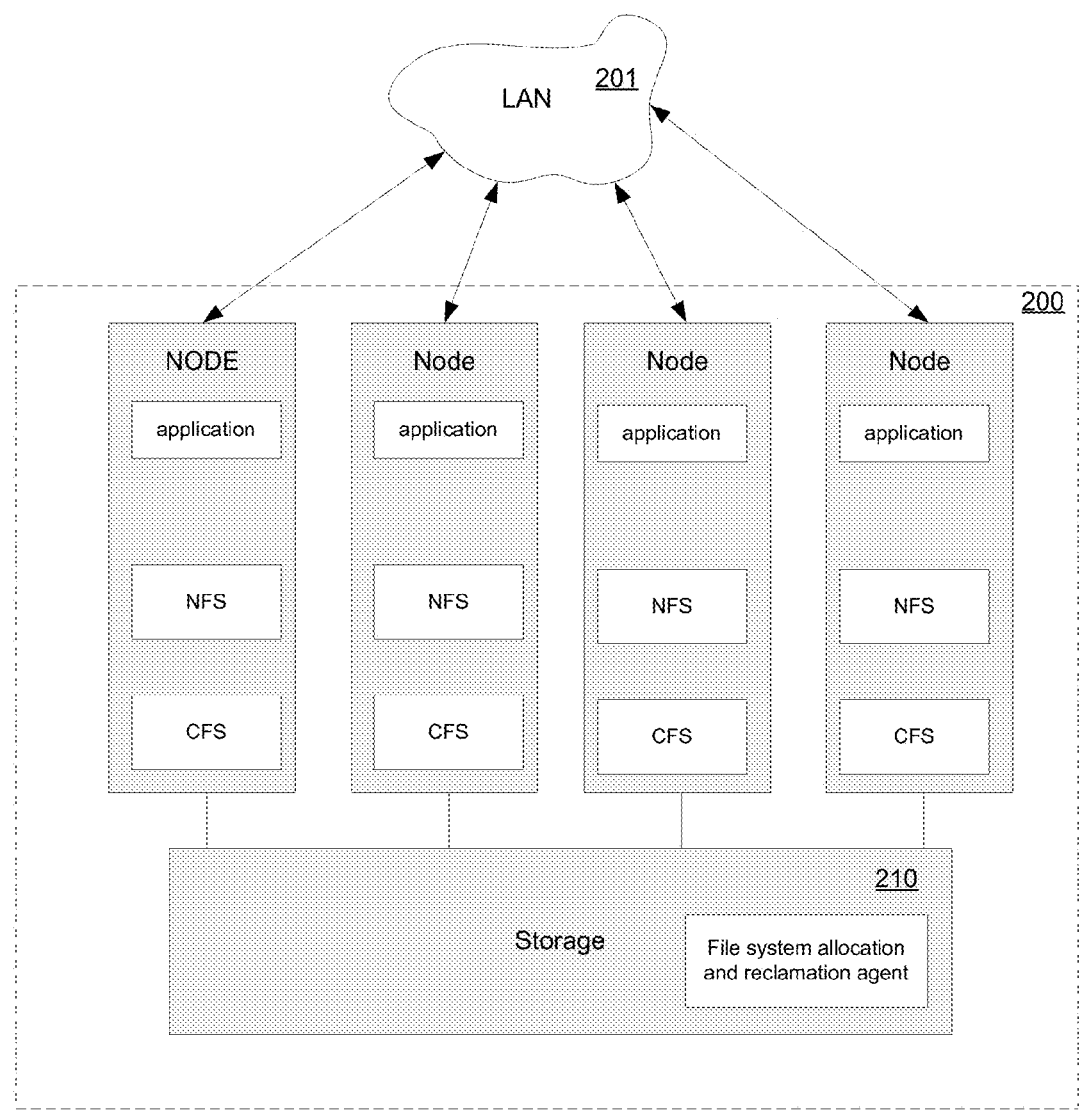
FIG. 2 shows a diagram depicting an exemplary high availability cluster-based computing system in accordance with one embodiment of the present invention.

FIG. 2 shows a diagram depicting an exemplary high availability cluster-based computing system 200 in accordance with one embodiment of the present invention. As illustrated in FIG. 2, 4 nodes are shown coupled to a common storage device 210. In one embodiment, the nodes on each host are an instantiation comprising an application, a network file system (NFS) and a cluster file system (CFS). Hence, the computer system 200 comprises a four node cluster. Each of the constituent nodes is shown connected to the storage device 210. The nodes of the cluster communicate with one another via the local area network 201. These local area networks can in turn be connected to one or more wide area networks (e.g., the Internet). Although the embodiment is described in the context of a cluster, it should be appreciated that embodiments of the present invention can readily scale and function in distributed computer systems and/or cloud based computer systems having hundreds or thousands of nodes.

FIG. 2 shows the manner in which the common storage device can support the mounting and dismounting of the various file systems to which it provides data storage services. The storage device 210 is typically equipped to provide high availability and redundancy while maintaining flexibility of the storage services provided to the various file systems. In the FIG. 2 embodiment, by way of example, the storage device 210 includes a file system allocation and reclamation agent that functions by allocating data blocks to thinly provisioned mounted file systems and providing storage space reclamation from provisioned space provided to the mounted file systems.

Figure 3:
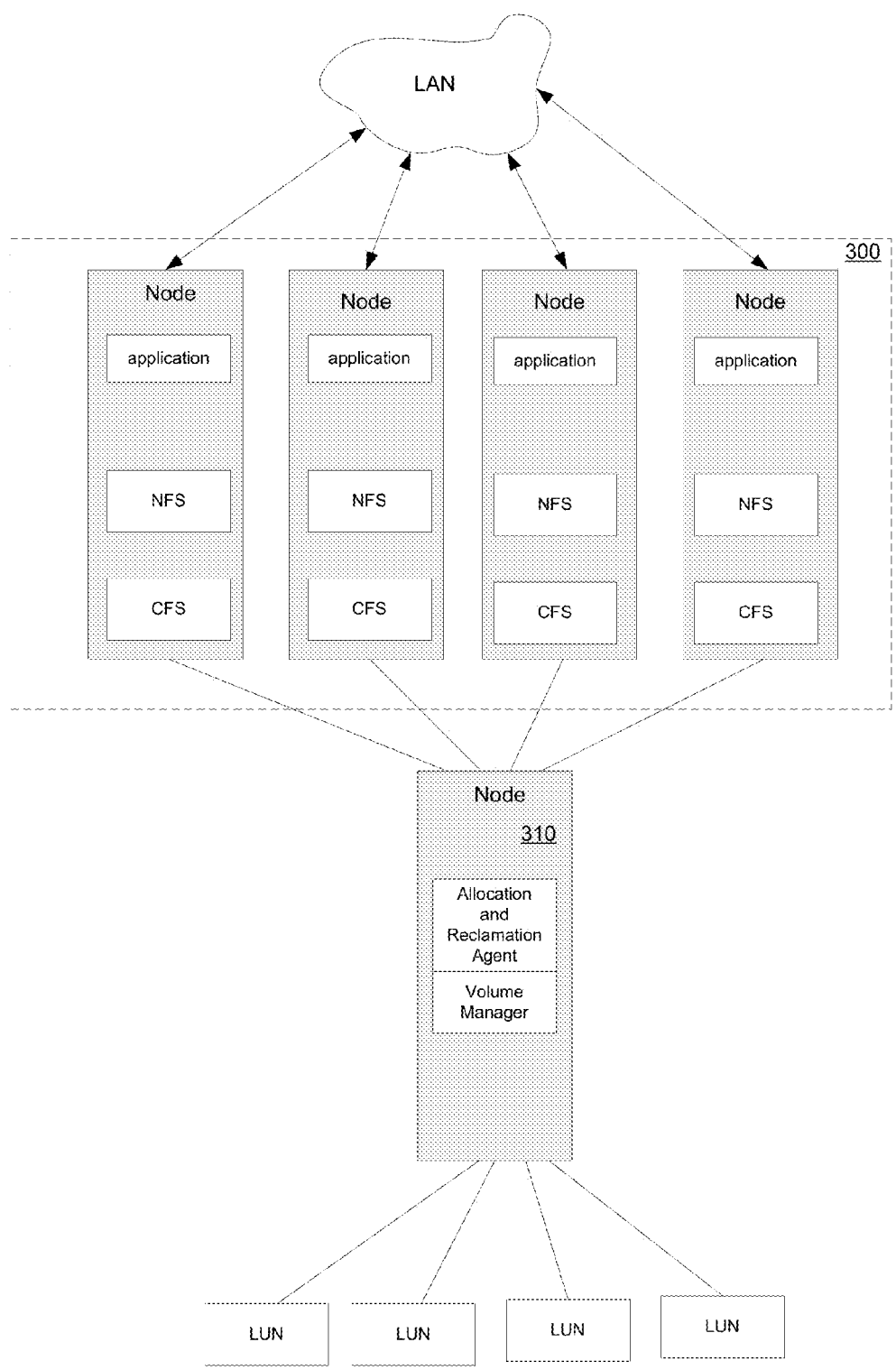
FIG. 3 shows a first exemplary implementation of a storage device in accordance with one embodiment of the present invention.

FIG. 3 shows a first exemplary implementation of a storage device in accordance with one embodiment of the present invention. As depicted in FIG. 3, the 4 nodes of the cluster 300 are coupled to node 310 which hosts a volume manager and the file system allocation and reclamation agent. The volume manager functions with a plurality of coupled LUNs (e.g., disk drives, solid-state drives, or the like) to provide volumes (e.g., data storage) which can be used to mount the plurality of network file systems and cluster file systems.

Figure 4:
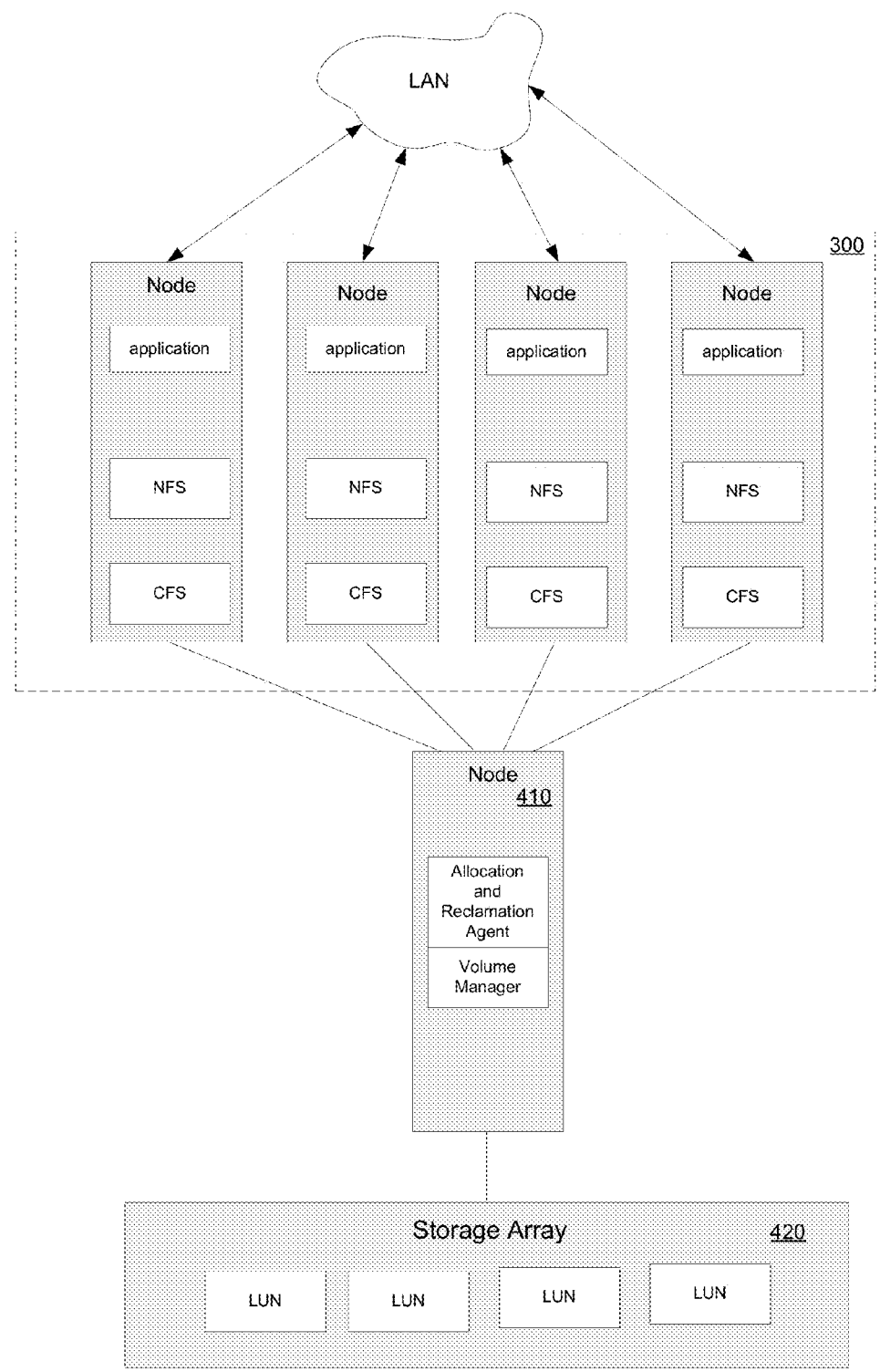
FIG. 4 shows a second exemplary implementation of a storage device in accordance with one embodiment of the present invention.

FIG. 4 shows a second exemplary implementation of a storage device in accordance with one embodiment of the present invention. As depicted in FIG. 4, the 4 nodes of the cluster 300 are coupled to a node 410 which hosts a volume manager and the file system allocation and reclamation agent. However, in the FIG. 4 embodiment, the volume manager functions with a plurality of LUNs that are created by a storage array 420. The storage array 420 is used to provide LUNs which can be used to mount the plurality of network file systems and cluster file systems.

In one embodiment, the file system allocation and reclamation agent includes functionality that is designed to allow the use of a mapping service that can identify used blocks of a file system to reclaim storage of one or more of the file systems without any regard to, and irrespective of, the file system mount state. The file system mount state refers to the difference is between whether a given file system is currently mounted, is being mounted, is currently unmounted, or changing state between the two. The reclamation agent can provide this functionality without requiring any specific service (e.g., a reclaim service) from the file system. However, it should be noted that the reclamation agent can take advantage of any reclamation service that may be offered by one or more of the file systems.

Hence, embodiments of the present invention provide a number of advantages when it comes to provisioning storage for multiple file systems. The ability to reclaim storage space from provisioned file systems greatly enhances resource utilization in a thin provisioned environment. Embodiments of the present invention provide functionality that enables the reclamation of storage from any provisioned file system without any cooperation from the file system and without intervening complications regarding whether the said file system is mounted, unmounted, or changing states in between.

Figure 5:
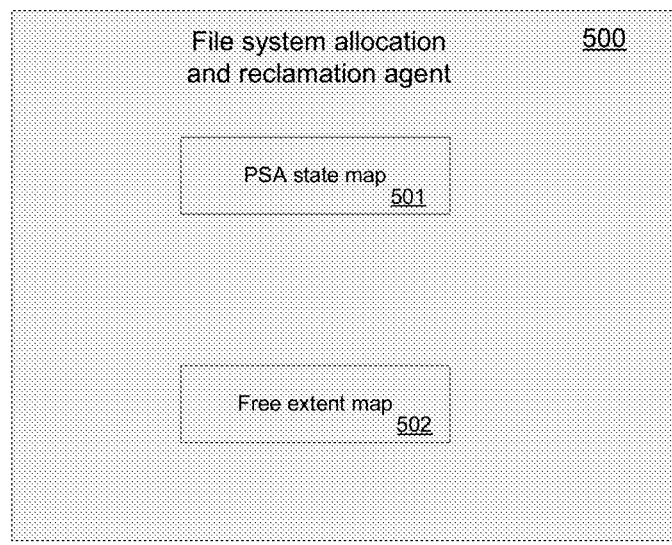
FIG. 5 shows a diagram of a file system allocation and reclamation agent in accordance with one embodiment of the present invention.

FIG. 5 shows a diagram of a file system allocation and reclamation agent 500 in accordance with one embodiment of the present invention. As depicted in FIG. 5, the agent 500 includes a physical storage allocated (PSA) state map 501 and a free extent state map 502.

The functionality of the agent 500 is directed towards ensuring a file system is resilient to storage failures. This functionality is particularly advantageous when used in the context of thinly provisioned arrays. For example, a thinly provisioned array can fail a write request (e.g., from a mounted file system, or the like) if it runs out of allocated physical storage. In a conventional situation, this if this allocation failure affected a metadata write of the file system, a severe corruption problem can occur. In response to such a scenario, the file system would be designated for full-file system check (e.g., referred to as a "fsck"). Worse, the full file system check can take hours to execute and also could have a very real possibility of data loss. Embodiments of the present invention include functionality to ensure these events do not occur.

Figure 6:
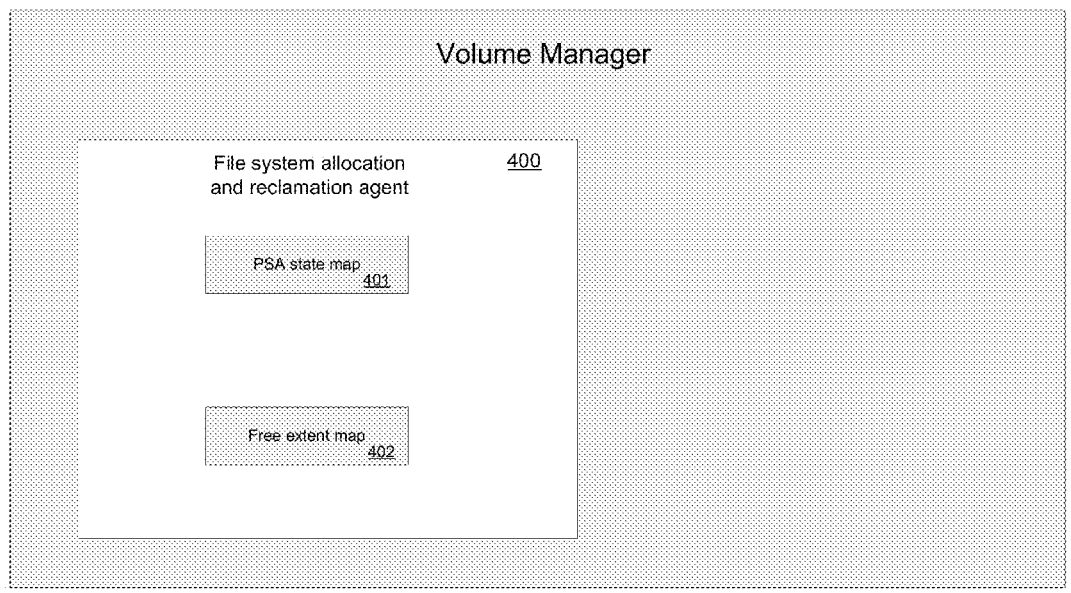
FIG. 6 shows a volume manager embodiment where the file system allocation and reclamation agent is part of the code comprising the volume manager in accordance with one embodiment of the present invention.

FIG. 6 shows a volume manager embodiment where the file system allocation and reclamation agent is part of the code comprising the volume manager in accordance with one embodiment of the present invention. FIG. 6 differs from FIG. 5 in that it shows the agent 400 instantiated within the same context as the volume manager. The volume manager functions by providing storage for mounted file systems.

In the FIG. 6 embodiment, in a typical operating scenario, a mounted file system writes new metadata to storage after allocating a set of blocks. These allocations are made after consulting a block map of free blocks. This block map is referred to as the free extent map 502. Thereafter, the blocks are written to as needed by the file system.

As described above, if the file system is mounted on a thinly provisioned array, and this thinly provisioned array fails to allocate storage to any metadata writes, the file system would consider such an event as a fatal error. Such an event could typically cause the file system to initiate a full file system check, which disables the file system for any other or tasks while the file system check is proceeding. At this point, it's very likely that any cached file data by the file system would not make it to disk and there would be considerable loss of user data as well. Embodiments of the present invention ensure such a scenario does not happen by using a physical storage allocation (PSA) state map.

A PSA state map results from a file system allocating additional metadata at file system check time to represent state of a chunk of data blocks. By way of example, the file system can create a bit map where a bit represents 2 k of storage, 64 k of storage, or the like. The PSA state map records whether the storage array has allocated physical storage for the chunk that it represents. In one embodiment, each bit in the map represents a respective chunk of storage, as described above.

Figure 7:
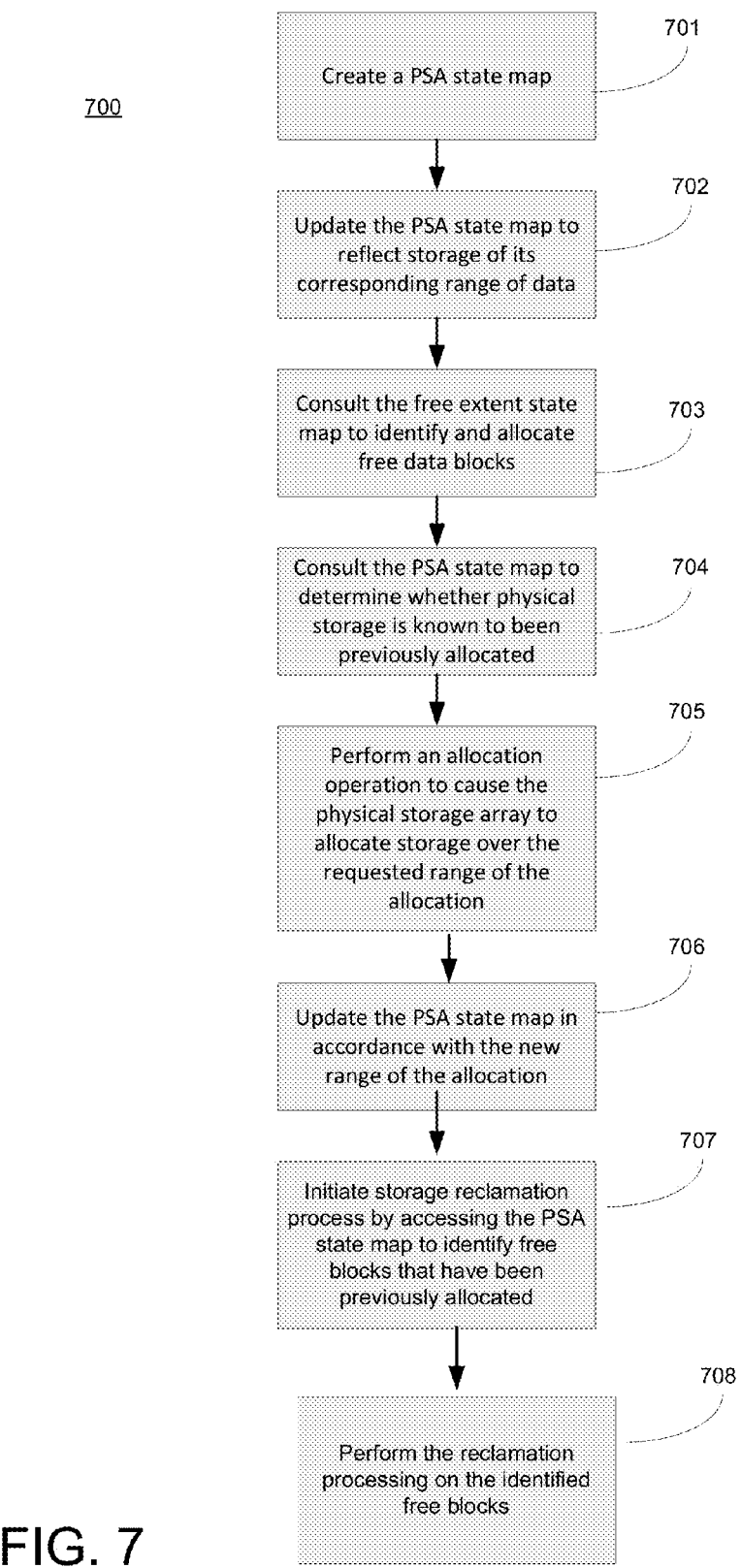
FIG. 7 shows a flowchart of the steps of a process for allocating storage and reclaiming storage from a thinly provisioned file system in accordance with one embodiment of the present invention.

FIG. 7 shows a flowchart of the steps of a process 700 for allocating storage and reclaiming storage from a thinly provisioned file system in accordance with one embodiment of the present invention.

In step 701, the volume manager creates a PSA state map by allocating additional metadata at a file system check time to her present the state of a chunk of blocks. As described above, this metadata can comprise a bitmap where bits in the map correspond to chunks of data storage.

In step 702, the PSA state map is updated to record whether the storage array has allocated physical storage for the chunk of data that it represents. In one embodiment, the default state of the PSA state map represents the thinly provisioned array as not having allocated physical storage for the concerned chunk.

In step 703, the free extent state map 402 is consulted. At storage allocation time (e.g., in the context of file data allocation, or metadata allocation, or both), the free extent map 402 of the file system is consulted to identify and allocate free blocks.

In step 704, once the free blocks have been identified, the PSA state map 401 is consulted to check whether the physical storage is known to have been previously allocated.

In step 705, if the physical storage has not been previously allocated, an operation is performed to make the storage array allocate storage over the range of the allocation.

In step 706, in response to the range of the newly allocated storage, the PSA state map correspondingly updated by changing the PSA state map to mark that range as allocated. In one embodiment, this range will remain marked as allocated in the PSA state map until the file system performs storage reclamation. The storage reclamation would result in the reclaimed ranges be marked again as unallocated in the PSA state map.

In step 707, the PSA state map is accessed to identify free blocks of the file system that have been previously allocated. The PSA state map can be consulted to preferentially allocate those free blocks of the file system that have been known and marked as allocated in the PSA state map, thus reducing the foot print of storage consumed by the file system.

In step 708, a reclamation process is performed based on the information contained in the PSA state map. During the reclamation process, reclamation needs to be implemented only for those ranges that are marked as free blocks and which were known to have been allocated in the PSA state map. This feature would advantageously make the reclamation process complete much faster than in a conventional sense.

Figure 8:
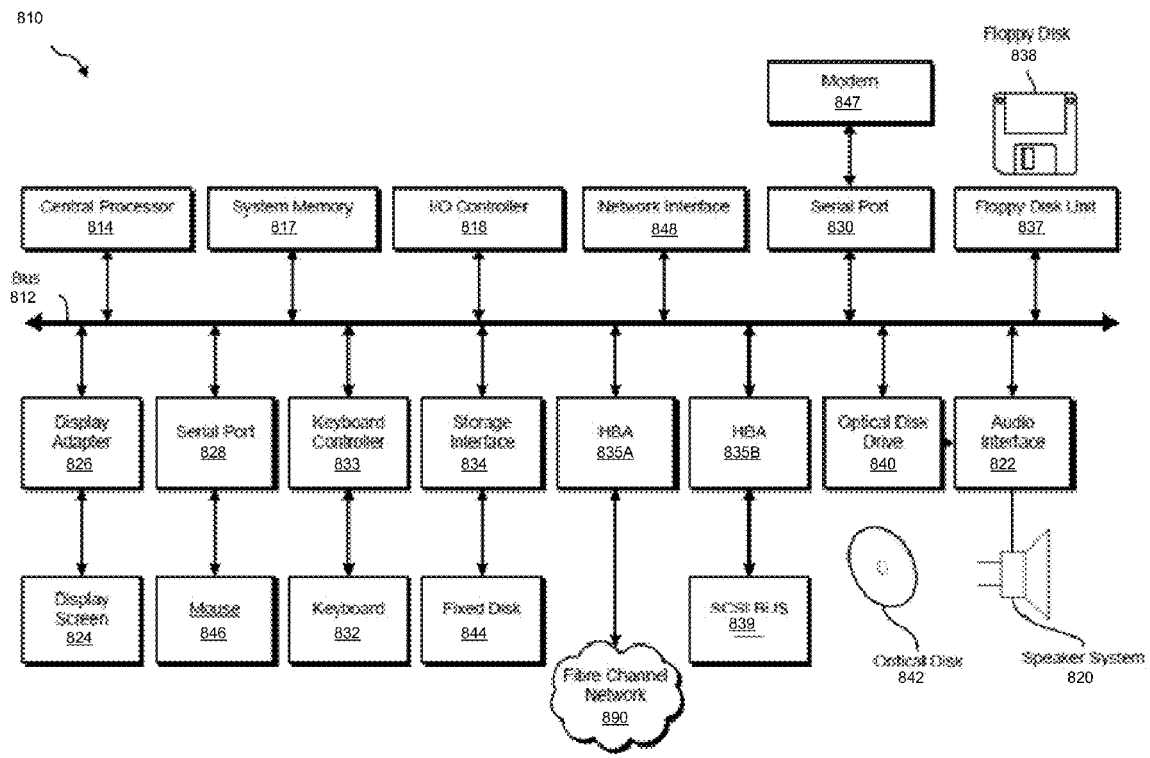
FIG. 8 depicts a block diagram of a computer system suitable for implementing certain functionality in accordance with one embodiment of the present invention.

FIG. 8 depicts a block diagram of a computer system 810 suitable for implementing certain functionality in accordance with one embodiment of the present invention. Computer system 810 includes a bus 812 which interconnects major subsystems of computer system 810, such as a central processor 814, a system memory 817 (typically RAM, but which may also include ROM, flash RAM, or the like), an input/output controller 818, an external audio device, such as a speaker system 820 via an audio output interface 822, an external device, such as a display screen 824 via display adapter 826, serial ports 828 and 830, a keyboard 832 (interfaced with a keyboard controller 833), a storage interface 834, a floppy disk drive 837 operative to receive a floppy disk 838, a host bus adapter (HBA) interface card 835A operative to connect with a Fiber Channel network 890, a host bus adapter (HBA) interface card 835B operative to connect to a SCSI bus 839, and an optical disk drive 840 operative to receive an optical disk 842. Also included are a mouse 846 (or other point-and-click device, coupled to bus 812 via serial port 828), a modem 847 (coupled to bus 812 via serial port 830), and a network interface 848 (coupled directly to bus 812).

Bus 812 allows data communication between central processor 814 and system memory 817, which may include read-only memory (ROM) or flash memory (neither shown), and random access memory (RAM) (not shown), as previously noted. The RAM is generally the main memory into which the operating system and application programs are loaded. In the FIG. 8 embodiment, the system memory 817 instantiates a reclamation manager module 850 which implements the continuous reclamation functionality described above. The ROM or flash memory can contain, among other code, the Basic Input-Output system (BIOS) which controls basic hardware operation such as the interaction with peripheral components. Applications resident with computer system 810 are generally stored on and accessed via a computer readable medium, such as a hard disk drive (e.g., fixed disk 844), an optical drive (e.g., optical drive 840), a floppy disk unit 837, or other storage medium. Additionally, applications can be in the form of electronic signals modulated in accordance with the application and data communication technology when accessed via network modem 847 or interface 848.

Storage interface 834, as with the other storage interfaces of computer system 810, can connect to a standard computer readable medium for storage and/or retrieval of information, such as a fixed disk drive 844. Fixed disk drive 844 may be a part of computer system 810 or may be separate and accessed through other interface systems. Modem 847 may provide a direct connection to a remote server via a telephone link or to the Internet via an internet service provider (ISP). Network interface 848 may provide a direct connection to a remote server via a direct network link to the Internet via a POP (point of presence). Network interface 848 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 8 need not be present to practice the present disclosure. The devices and subsystems can be interconnected in different ways from that shown in FIG. 8. The operation of a computer system such as that shown in FIG. 8 is readily known in the art and is not discussed in detail in this application. Code to implement the present disclosure can be stored in computer-readable storage media such as one or more of system memory 817, fixed disk 844, optical disk 842, or floppy disk 838. The operating system provided on computer system 810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 9:
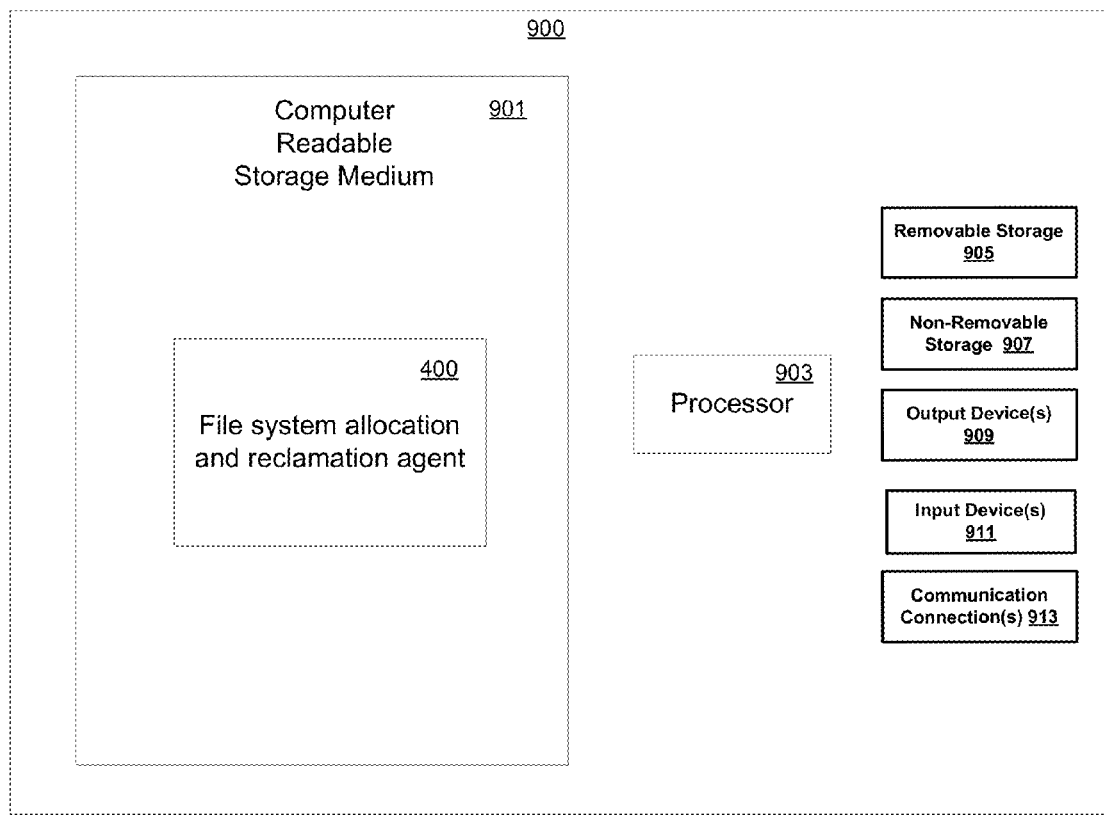
FIG. 9 shows an exemplary computer system according to one embodiment.

FIG. 9 shows an exemplary computer system 900 according to one embodiment. Computer system 900 depicts the components of a basic computer system providing the execution environment for certain hardware-based and software-based functionality for the above described embodiments. For example, computer system 900 can be a system upon which the one or more software agents (e.g., file system allocation and reclamation agent 400 from FIG. 4) are instantiated. Computer system 900 can be implemented as, for example, a server computer system, workstation computer system, desktop computer system, or laptop computer system. Similarly, computer system 900 can be implemented as a handheld device. Computer system 900 typically includes at least some form of computer readable media (e.g., computer readable storage medium 901). Computer readable media can be a number of different types of available media that can be accessed by computer system 900 and can include, but is not limited to, computer storage media.

In its most basic configuration, computer system 900 typically includes processing unit 903 and memory 901. Depending on the exact configuration and type of computer system 900 that is used, memory 901 can be volatile (e.g., such as DRAM, etc.) 901a, non-volatile 901b (e.g., such as ROM, flash memory, etc.) or some combination of the two. Similarly, the memory 901 can comprise other devices besides solid-state devices, such as, for example, magnetic disk-based media, optical media, or the like.

Additionally, computer system 900 can include other mass storage systems (e.g., removable 905 and/or non-removable 907) such as magnetic or optical disks or tape. Similarly, computer system 900 can include input devices 909 and/or output devices 911 (e.g., such as a display). Computer system 900 can further include network connections 913 to other devices, computers, networks, servers, etc. using either wired or wireless media. As all of these devices are well known in the art, they need not be discussed in detail.

It should further be noted, that the computer system 900 can have some, most, or all of its functionality supplanted by a distributed computer system having a large number of dispersed computing nodes, such as would be the case where the functionality of the computer system 900 is partly or wholly executed using a cloud computing environment.

The foregoing description, for the purpose of explanation, has been described with reference to specific embodiments. However, the illustrated discussions above are not intended to be exhaustive or to limit the invention to the precise forms disclosed. Many modifications and variations are possible in view of the above teachings. Embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for storage allocation and reclamation in a storage device, comprising:
  creating a physical storage allocation state map that indicates whether a plurality of data blocks comprising a range of data is allocated or unallocated in a shared storage device, wherein a default state of the physical storage allocation state map indicates no allocated storage for the plurality of data blocks;

consulting a free extent state map to identify free data blocks of the shared storage device, wherein the free extent state map is separate from the physical storage allocation state map;

performing an allocation operation causing the shared storage device to allocate storage over a requested range of allocation, wherein the allocation operation preferentially allocates storage to a first plurality of data blocks that are marked as free blocks in the free extent state map and as having been allocated in the physical storage allocation state map;

updating the physical storage allocation state map in accordance with the requested range of allocation;

upon a subsequent reclamation process, accessing the physical storage allocation state map to identify a second plurality of data blocks that are marked as free blocks in the free extent state map and as having been allocated in the physical storage allocation state map; and performing reclamation processing on the identified second plurality of data blocks that are marked as free blocks in the free extent state map and as having been allocated in the physical storage allocation state map.

2. The method of claim 1, wherein the free extent state map is consulted to identify and allocate free data blocks of the shared storage device, and wherein the physical storage allocation state map is consulted to determine whether physical storage of the shared storage device is known to have been previously allocated.

3. The method of claim 1, wherein the physical storage allocation state map comprises a map that tracks a storage condition of a plurality of chunks of data having a predetermined size.

4. The method of claim 1, wherein the physical storage allocation state map comprises a bitmap, and wherein bits of the bitmap track a storage condition of a plurality of chunks of data having a predetermined size.

5. The method of claim 1, wherein the physical storage allocation state map is accessed to preferentially free blocks of the shared storage device that are indicated as previously allocated.

6. The method of claim 1, wherein the shared storage device comprises a disk array.

7. The method of claim 1, wherein the shared storage device is part of a cluster of a distributed computer system.

8. A non-transitory computer readable storage medium having stored thereon computer executable instructions that, if executed by a computer system, cause the computer system to perform a method comprising:

creating a physical storage allocation state map that indicates whether a plurality of data blocks comprising a range of data is allocated or unallocated in a shared storage device, wherein a default state of the physical storage allocation state map indicates no allocated storage for the plurality of data blocks;

consulting a free extent state map to identify free data blocks of the shared storage device, wherein the free extent state map is separate from the physical storage allocation state map;

performing an allocation operation causing the shared storage device to allocate storage over a requested range of allocation, wherein the allocation operation preferentially allocates storage to a first plurality of data blocks that are marked as free blocks in the free extent state map and as having been allocated in the physical storage allocation state map;

updating the physical storage allocation state map in accordance with the requested range of allocation;

upon a subsequent reclamation process, accessing the physical storage allocation state map to identify a second plurality of data blocks that are marked as free blocks in the free extent state map and as having been allocated in the physical storage allocation state map; and performing reclamation processing on the identified second plurality of data blocks that are marked as free blocks in the free extent state map and as having been allocated in the physical storage allocation state map.

9. The non-transitory computer readable storage medium of claim 8, wherein the free extent state map is consulted to identify and allocate free data blocks of the shared storage device, and wherein the physical storage allocation state map is consulted to determine whether physical storage of the shared storage device is known to have been previously allocated.

10. The non-transitory computer readable storage medium of claim 8, wherein the physical storage allocation state map comprises a map that tracks a storage condition of a plurality of chunks of data having a predetermined size.

11. The non-transitory computer readable storage medium of claim 8, wherein the physical storage allocation state map comprises a bitmap, and wherein bits of the bitmap track a storage condition of a plurality of chunks of data having a predetermined size.

12. The non-transitory computer readable storage medium of claim 8, wherein the physical storage allocation state map is accessed to preferentially free blocks of the shared storage device that are indicated as previously allocated.

13. The non-transitory computer readable storage medium of claim 8, wherein the shared storage device comprises a disk array.

14. The non-transitory computer readable storage medium of claim 8, wherein the shared storage device is part of a cluster of a distributed computer system.

15. A computer system having a microprocessor coupled to a computer readable memory, the memory having computer readable code therein which when executed by the computer system causes the computer system to implement a method comprising:

creating a physical storage allocation state map that indicates whether a plurality of data blocks comprising a range of data is allocated or unallocated in a shared storage device, wherein a default state of the physical storage allocation state map indicates no allocated storage for the plurality of data blocks;

consulting a free extent state map to identify free data blocks of the shared storage device, wherein the free extent state map is separate from the physical storage allocation state map;

performing an allocation operation causing the shared storage device to allocate storage over a requested range of allocation, wherein the allocation operation preferentially allocates storage to a first plurality of data blocks that are marked as free blocks in the free extent state map and as having been allocated in the physical storage allocation state map;

updating the physical storage allocation state map in accordance with the requested range of allocation;

upon a subsequent reclamation process, accessing the physical storage allocation state map to identify a second plurality of data blocks that are marked as free blocks in the free extent state map and as having been allocated in the physical storage allocation state map; and performing reclamation processing on the identified second plurality of data blocks that are marked as free blocks in the free extent state map and as having been allocated in the physical storage allocation state map.

16. The computer system of claim 15, wherein the free extent state map is consulted to identify and allocate free data blocks of the shared storage device, and wherein the physical storage allocation state map is consulted to determine whether physical storage of the shared storage device is known to have been previously allocated.

17. The computer system of claim 15, wherein the physical storage allocation state map comprises a map that tracks a storage condition of a plurality of chunks of data having a predetermined size.

18. The computer system of claim 15, wherein the physical storage allocation state map comprises a bitmap, and wherein bits of the bitmap track a storage condition of a plurality of chunks of data having a predetermined size.

19. The computer system of claim 15, wherein the physical storage allocation state map is accessed to preferentially free blocks of the shared storage device that are indicated as previously allocated.

20. The computer system of claim 8, wherein the shared storage device comprises a disk array, and wherein the shared storage device is part of a cluster of a distributed computer system.

* * * * *